United States Patent
Van Gurp et al.

(10) Patent No.: US 9,242,789 B2
(45) Date of Patent: Jan. 26, 2016

(54) PROCESS FOR FOIL RIPENING OF CHEESE

(75) Inventors: Marnix Van Gurp, Sittard (NL); Corstiaan Johannes Hooft, Maastricht (NL); Josien Krijgsman, Maastricht (NL); Alexander Antonius Marie Stroeks, Valkenburg Aan de Geul (NL)

(73) Assignee: DSM IP ASSETS B.V., Heerlen (NL)

(*) Notice: Subject to any disclaimer, the term of this patent is extended or adjusted under 35 U.S.C. 154(b) by 692 days.

(21) Appl. No.: 12/682,657

(22) PCT Filed: Oct. 12, 2008

(86) PCT No.: PCT/EP2008/063637
§ 371 (c)(1),
(2), (4) Date: Jul. 28, 2010

(87) PCT Pub. No.: WO2009/047332
PCT Pub. Date: Apr. 16, 2009

(65) Prior Publication Data
US 2010/0297311 A1    Nov. 25, 2010

(30) Foreign Application Priority Data
Oct. 12, 2007    (EP) .................................... 07020018

(51) Int. Cl.
| | |
|---|---|
| B65D 85/76 | (2006.01) |
| B65D 85/00 | (2006.01) |
| A23C 19/16 | (2006.01) |
| B65B 25/06 | (2006.01) |

(52) U.S. Cl.
CPC .............. *B65D 85/70* (2013.01); *A23C 19/166* (2013.01); *B65B 25/06* (2013.01); *B65D 85/76* (2013.01); *Y10T 428/1397* (2015.01)

(58) Field of Classification Search
CPC ...... A23C 19/166; B65D 85/70; B65D 85/76; Y10T 428/1397; B65B 25/06
USPC ......... 426/106, 130, 392, 410, 415, 582, 641, 426/512; 206/524.6; 428/36, 92
See application file for complete search history.

(56) References Cited

U.S. PATENT DOCUMENTS

| | | | |
|---|---|---|---|
| 3,060,035 A | 10/1962 | Berst | |
| 5,167,974 A | 12/1992 | Grindrod et al. | |
| 5,194,283 A | 3/1993 | Dupas et al. | |
| 2002/0034622 A1 | 3/2002 | Edwards et al. | |
| 2003/0087003 A1 | 5/2003 | Ang | |
| 2007/0031546 A1* | 2/2007 | Nelson et al. | 426/106 |
| 2007/0042089 A1 | 2/2007 | Grah | |
| 2007/0104836 A1 | 5/2007 | Zhao et al. | |

FOREIGN PATENT DOCUMENTS

| | | |
|---|---|---|
| CA | 2050837 A1 | 3/1992 |
| CH | 381065 A | 8/1964 |
| DE | 102004060111 A1 | 7/2005 |
| EP | 0384533 A2 | 8/1990 |
| EP | 0384553 A2 | 8/1990 |
| EP | 0453925 A1 | 10/1991 |
| EP | 0501891 A1 | 9/1992 |
| EP | 1041010 A1 | 10/2000 |
| EP | 1287744 A1 | 3/2003 |
| EP | 1842794 A1 | 10/2007 |
| EP | 1915911 A1 | 4/2008 |
| WO | 9912735 A1 | 3/1999 |
| WO | 0247904 A2 | 6/2002 |
| WO | 2005102062 A2 | 3/2005 |
| WO | 2005113236 A2 | 12/2005 |
| WO | 2009010547 A1 | 1/2009 |

OTHER PUBLICATIONS

EP 0384553, Aug. 29, 1990, Espacenet translation.*
International Search Report for PCT/EP2008/063637, mailed Apr. 21, 2009.
Written Opinion of the International Searching Authority for PCT/EP2008/063637, mailed Apr. 21, 2009.
Sebti et al. ("Edible Bioactive Fatty Acid-Cellulosic Derivative Composites Used in Food-Packaging Applications," J. Agric. Food Chem., pp. 4290-42994, pub 2002).
Scannell et al. ("Development of bioactive food packaging materials using immobilised bacteriocins Lacticin 3147 and Nisaplin", International Journal of Food Microbiology, 60 (2000), pp. 241-249, pub. 2000).
Oliveria et al. ("Development and Evaluation of Antimicrobial Natamycin-incorporated Film in Gorgonzola Cheese Conversation", Packaging Technology Science 2007; 20: 147-153, pub. online Oct. 18, 2006 in Wiley InterScience).
International Search Report for PCT/EP2010/051916 mailed Jul. 1, 2010.
Written Opinion for PCT/EP2010/051916 mailed Jul. 1, 2010.
Chen et al., "Antimicrobial and physiochemical properties of methycellulose and chitosan films containing a preservative", Journal of Food Processing and Preservation, vol. 20, Jan. 1996, pp. 379-390.
ASTM, "ASTM E 96-00 Standard Test Methods for Water Vapor Transmission of Materials." ASTM Standards, vol. 14.02, 2000.
ASTM, "ASTM D 3985-05, Standard Test Method for Oxygen Gas Transmission Rate Through Plastic Film and Sheeting Using a Coulometric Sensor" ASTM Standards, 2005.

(Continued)

*Primary Examiner* — Leslie Wong
(74) *Attorney, Agent, or Firm* — Miles & Stockbridge PC

(57) ABSTRACT

The present invention relates to a process for preparing foil-ripened cheese comprising (i) introducing cheese after brining into a cheese-aging packaging containing an opening for receiving cheese, (ii) closing the packaging, and (iii) ripening the cheese, wherein the cheese-aging packaging comprises a thermoplastic, monolithic film and the closed cheese-aging packaging has a water vapor transmission rate of at least 10 $g/m^2/24$ hours at 10° C. and 85% relative humidity and an oxygen permeability of at most 100 $cm^3/m^2/24$ hours/atm at 10° C. and 85% relative humidity.

14 Claims, 1 Drawing Sheet

(56) References Cited

OTHER PUBLICATIONS

ASTM, "ASTM F 1927-07, Standard Test Method for Determination of Oxygen Gas Transmission Rate, Permeability and Permeance at Controlled Relative Humidity Through Barrier Materials Using a Coulometric Detector" ASTM Standards, 2007.

Ox-Tran Model 2/21 the Standard for Oxygen Transmission Rate Testing of Flat Films & Finished Packages, Mocon Product Brochure.

Communication of notices of opposition dated May 26, 2014, issued in Application No. 08837198.4-1358/2200447.

Communication of notice of opposition dated Apr. 30, 2014, issued in Application No. 08837198.4-1358/2200447.

\* cited by examiner

PROCESS FOR FOIL RIPENING OF CHEESE

This application is the U.S. national phase of International Application No. PCT/EP2008/063637 filed 10 Oct. 2008, which designated the U.S. and claims priority to EP Application No. 07020018.3 filed 12 Oct. 2007, the entire contents of each of which are hereby incorporated by reference.

BACKGROUND

1. Field of the Invention

The invention relates to a process for preparing foil-ripened cheese, in particular of the half-hard or hard type, comprising (i) introducing cheese after brining into a cheese-aging packaging containing an opening for receiving cheese, (ii) closing the packaging, and (iii) ripening the cheese to obtain ripened cheese packed in an easily removable packaging. The present invention also relates to the cheese-ripening packaging and to the cheese thus obtained.

2. Description of Related Art

The conventional method, as referred to in EP 1287744, for preparing for example a Gouda cheese comprises a ripening step, wherein the young cheese, after brining, is ripened at 12-14° C. to, minimally an age of four weeks. To protect the rind after brining, the outside of the young cheese is treated with a dispersion of plastic, usually polyvinylacetate, in water. During this ripening, referred to with the term "standard ripening" or, also, "natural ripening", the cheese loses moisture.

In the natural ripening process, the outside of the cheese after brining is treated with such a dispersion which upon drying forms a protective coating around the cheese. As described in EP 1 537 785, said coating fulfills essentially the following demands:

- protection of the cheese against physical damage
- prevention of formation of cracks during ripening
- carrier of antimicrobial compounds and/or colorants
- avoiding contamination such as attachment of dirt and dust cosmetic reasons.

The processing of cheese usually involves applying aqueous dispersions of polymers, in particular polyvinyl acetate, having typically a solids content of between 35 and 48 wt %. The relatively viscous dispersion is generally either applied automatically by a coating machine, or manually, with a sponge or the like. A common coating procedure involves covering the sides and the top half of the cheese immediately after leaving the brine bath, then after 48 hours turning the cheese and treating the remaining part. This process of treating the sides and one half of the cheese is carried out several times, e.g. after 4, 6, 9, 12, and 15 days and thereafter at larger time intervals depending on the type of cheese, the required ripening time (e.g. young compared to old cheese), storage conditions and, possibly, other factors. Other coating procedures with different time intervals may also be applied. After application of this material to the cheese-rind, a film is formed by the drying of the coating material.

Under ware-house conditions (temperature and relative humidity, RH) a film is usually formed within 24 hours. A disadvantage of the natural ripening process is that it is labor and/or cost (if automated) intensive. Another drawback of the application of the current commercially available cheese coatings is that the coating is not easily removable resulting in that the cutting loss, when cut the cheese block into slices or bars or when grated, can run up to as much as 4%, even up to 15%. A major advantage of the natural ripening process, however, is that cheese can be obtained with different ripening degrees, ranging from young cheese to old cheese.

Another major advantage is that the natural ripening process results, in case the required conditions are met, in cheese having a flavor that is usually appreciated as very good. Characteristics typical for a natural ripened cheese are very good flavor development, firmness, low stickiness, color deviation from the center of the cheese towards the surface of the cheese and the presence of a drying rind.

A disadvantage of the natural ripening process as described above is the relatively high loss of water out of the cheese. Under practical conditions (RH=85% and T=12-14 DEG C), 10-12% of the cheese weight can be lost in 10-12 weeks of ripening due to the evaporation of water out of the cheese. To prevent excessive evaporative loss of water from the cheese during ripening, the relative humidity at storage is already high (>80%). Under these storage conditions, an excess of mould growth may occur which then frequently results in serious adverse effects; sometimes mould growth is so excessive that the cheese can not be sold for consumption.

Another method for ripening cheese of the half-hard or hard type is the less labor and/or cost intensive foil ripening process, as for example referred to in EP1287744. In this method the cheese is ripened as rindless cheese, by packing the cheese after brining in a multilayer foil as for example described in DE10062417 and is then ripened. Cheese ripened in this manner loses no moisture during ripening. With the foil ripening process, young cheese can be obtained, however with little flavor development. An advantage of the known foil ripening process is that, as the foil is easily peelable, foil-ripened cheese, which is often of rectangular shape, gives no or hardly any losses, when grated or cut into slices or bars.

However, a disadvantage of foil-ripening is that the cheese also undergoes a different type of ripening. With this different type of ripening, the development of flavor lags. This development can be increased by using added starter cultures as for example described in EP1287744, but than an extra ingredient is needed and using added starter cultures makes the foil ripening process more expensive. Moreover, a cheese ripened in foil as for example described in DE10062417 may have an undesired consistency; for instance the texture of the cheese can be too sandy or too soft. Furthermore, it appears to be impossible to obtain a ripened cheese older than 6 weeks not having a bitter flavor deficiency. Disadvantages of the ripening cheese in a multilayer foil as for example described in DE10062417 is that there is little flavor development and/or the cheese has an undesired consistency, i.e. low firmness and/or high stickiness, the latter is in particular disadvantageous when slicing or grating the cheese. Moreover, by further ripening of the cheese, the flavor development and/or consistency diverge from the flavor development and/or consistency as obtained by the natural ripening process, and/or yeast growth can occur, causing off taste. Yeast growth is in particular disadvantageous when slicing the cheese. Thus the so ripened cheese has characteristics that are far removed from the characteristics typical for a natural ripened cheese.

SUMMARY

The object of the invention is to provide a process for obtaining foil-ripened cheese, in particular of the half-hard or hard type, in which ripened cheese can be obtained that corresponds more to the natural ripened cheese.

Figure 1:
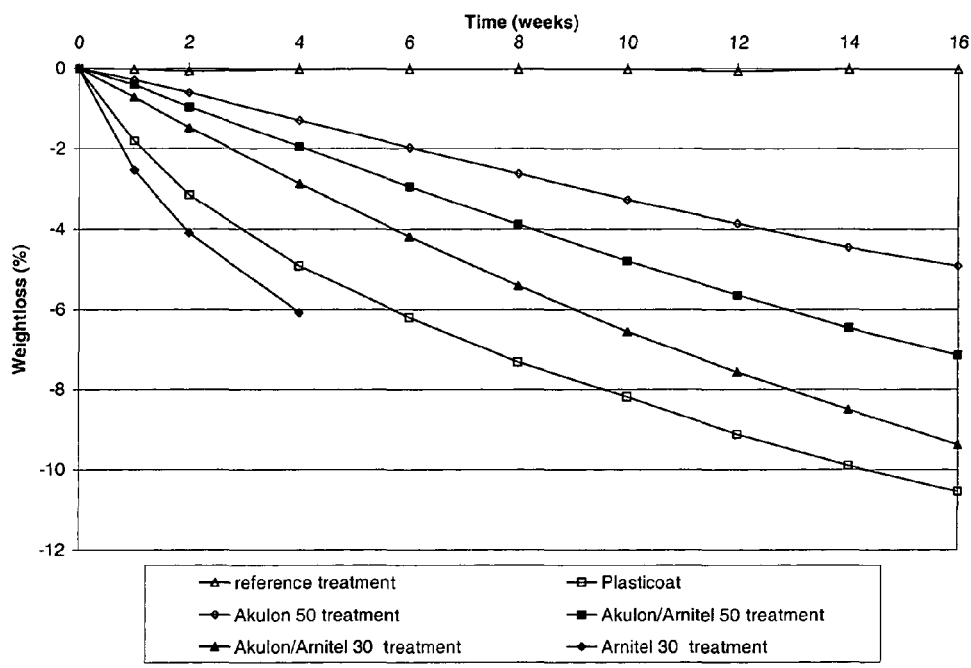
FIG. 1 shows the relative weight loss during ripening of treated cheeses packed in material 1-5 and the cheese treated with material 6.

It has surprisingly been found that this object can be achieved by ripening the cheese after brining in a cheese-aging packaging comprising a thermoplastic, monolithic film and the closed cheese-aging packaging having a water vapor transmission rate of at least 10 g/m$^2$·24 hours (measured according to ASTM E96B cup test at 10° C. and 85% relative humidity on a film) and an oxygen permeability of at most 100 cm$^3$/m$^2$·24 hours·atm (measured according to ASTM standard D3985 at 10° C. and 85% relative humidity on a film using Mocon equipment).

DETAILED DESCRIPTION OF A PREFERRED EMBODIMENT

With the process of the present invention, the advantages of the foil-ripening process as described above (no necessity to provide a coating, and thus less labor intensive, but using an easily peelable packaging having the additional advantage of less cutting losses or less losses when grated) can be combined with obtaining a cheese that corresponds more to a cheese having undergone a natural ripening, while the evaporative loss of water is reduced. A further advantage of the foil-ripening process of the present invention is that further ripening can be effected with no or reduced flavor deviation, with no or reduced consistency deviation and/or with no or reduced mould and yeast growth compared to the known foil-ripening process. Thus the ripened cheese obtained with the process of the invention has characteristics that corresponds more to the characteristics typical for a natural ripened cheese. Another advantage of the process according to the invention is that cheese can be obtained with a dry-rind, as is also present in a natural ripened cheese, but without a plastic coating. The presence of such a dry-rind influences the further ripening by building a resistance to further excessive drying. Moreover, the presence of such a dry-rind makes the foil ripened cheese even more resembling a natural-ripened cheese. A dry-rind has a moisture content that is less than that of the average of the cheese. Still another advantage of the present invention is that ripened cheese can be obtained with a color deviation from the center to the rind resulting in that the foil ripened cheese even more resembles a natural-ripened cheese.

Still another advantage of the process of the present invention is that the ripening process can be controlled by means of the relative humidity of the atmosphere in the warehouse. Still another advantage is that the relative humidity of the atmosphere in the warehouse in different compartments and/or phases of the ripening can be lowered, even to 70%. A lower relative humidity of the atmosphere in the warehouse may result in less mould growth. Furthermore, a lower relative humidity of the atmosphere in the warehouse is advantageous from an energetically point of view.

As used herein, a monolithic film is a film not containing holes, perforations, pores or micro-pores that provide a direct pathway for water molecules to flow. On contrast, a monolithic film contains molecular level pathways for diffusion of water. A monolithic film is able to transport water molecules by molecular diffusion through the polymer matrix, using a difference in partial water pressure at both sides of the film and/or a water concentration gradient across the film as the driving force. In general, it is the hydrophilic (affinity for water) and/or hygroscopic (inherent ability to absorb moisture) nature of monolithic films that allow moisture to pass from the side with the highest relative humidity to the side with the lowest relative humidity. More specifically, monolithic films transport water molecules by an absorption-diffusion-desorption model. Firstly, water is absorbed on the side with the highest relative humidity by the hygroscopic film. The absorbed water molecules than diffuse through the bulk of the hygroscopic material and are consequently desorbed on the side with the lowest relative humidity. The process by which a porous, micro-porous or perforated film permeates water moisture is in contrast to monolithic films, i.e. perforated or (micro-) porous films allow for the physical transport of the water molecules through the holes, pores or micropores. The driving force in this case is also the difference in partial water partial pressure of both sides of the film and/or the concentration gradient of water across the film. As used herein, a monolithic film excludes perforated, porous or micro-porous films.

In order to be able to function as a packaging, the packaging, as a rule, must possess sufficient mechanical properties such as for example puncture resistance and tear strength. In view of this, the thickness of the packaging is usually at least 15 μm and mostly at least 25 μm.

In the process of the present invention, the closed cheese-aging packaging has a water vapor transmission rate of at least 10 g/m$^2$·24 hours (measured according to ASTM E96B cup test at 10° C. and 85% relative humidity on a film). Preferably, the water vapor transmission rate is at least 20 g/m$^2$/24 hours, more preferably at least 25 g/m$^2$/24 hours and even more preferably at least 30 g/m$^2$/24 hours. Preferably, the closed cheese-aging packaging has a water vapor transmission rate of at most 60 g/m$^2$/24 hours, more preferably at most 50 g/m$^2$/24 hours and even more preferably at most 45 g/m$^2$/24 hours. At a water vapor transmission rate higher than 60 g/m$^2$/24 hours, the surface of the cheese may dehydrate too much resulting in a thick dehydrated surface (dry-rind). The presence of such a thick dehydrated surface may result in that the obtained consistency of the cheese deviates from the consistency that one would expect at the given ripening time. Furthermore this dehydrated surface layer will reduce further water loss and ripening of the cheese.

The closed cheese-aging packaging has an oxygen permeability (measured according to ASTM standard D3985 at 10° C. and 85% relative humidity on a film) of at most 100 cm$^3$/m$^2$·24 hours·atm. Preferably, the closed cheese-aging packaging has an oxygen permeability of at most 50 cm$^3$/m$^2$·24 hours·atm. More preferably, the oxygen permeability is at most 20 cm$^3$/m$^2$·24 hours·atm. Low oxygen permeability is advantageous as it results in inhibition of mould growth.

The water vapor transmission rate values and oxygen permeability values as referred to apply to at least the part of the packaging that will surround the cheese to be ripened.

In the process of the present invention, at least a part of the ripening process is performed while the cheese is present in the cheese-aging packaging, preferably the entire ripening process is effected while the cheese is present in the cheese-aging packaging.

In one embodiment of the present invention, cheese milk can be used to which, in addition to the customary amount of acid, one or more adjunct starters are added, as for example described in EP1287744A. In another and more preferred embodiment, cheese milk can be used to which no or less adjunct starter has been added. It has surprisingly been found that with the process of the present invention there is more flavor development compared with ripening in a multilayer foil as for example described in DE10062417, even without adding an adjunct starter to the cheese milk. Furthermore, it has surprisingly been found that, even without adding an adjunct starter to the cheese milk, there is less or even no off flavor development with further ripening compared with further ripening in a multilayer foil as for example described in DE10062417. The fact that with the process of the present invention, the use of an adjunct starter can be omitted is advantageous as this makes the process even simpler.

The cheese-aging packaging comprises a thermoplastic layer, in particular a thermoplastic, monolithic film. In one embodiment, the packaging comprises a single thermoplastic layer. In another embodiment, the packaging comprises two or more thermoplastic layers of different or the same composition. In all these embodiments, the surface of the layer(s) can be printed, for example for branding purposes, as known in the art. In case the packaging comprises at least two thermoplastic layers, printing can be positioned between two thermoplastic layers. Multilayer films can be obtained by methods known in the art such as co-extrusion or lamination. In the case of printing the outer layer in reverse, the multilayer structure is usually be obtained by laminating process. Each thermoplastic layer can be a blend of several thermoplastic polymers.

Usually, the thermoplastic film(s) is produced from the melt by known techniques, such as for example cast-extrusion or extrusion-blowing.

The thermoplastic polymer used for the thermoplastic film(s) is preferably a polyamide, a polyester, a polyether, the copolymers thereof or a mixture of at least two of these thermoplastic polymers. Preferred copolymers are block copolymers. More preferably, the thermoplastic polymer used for the thermoplastic film is polyamide, polyetherester, polyetheramide or mixtures thereof.

Examples of suitable polyamides (PA) are aliphatic polyamides, that may eventually be branched polyamides, such as PA6, PA46, PA66, PA6/66, PA 11, PA12, semi aromatic polyamides as MXD6, PA6I/6T, PA66/6T, fully aromatic polyamides and copolymers and blends of the listed polyamides. The effect of the invention is most favourable in compositions comprising polyamide having high amide content, such as for example PA-6 in contrast to for example PA-11 or PA-12, since these polyamides as such have higher water vapor transmission rates than PA-11 or PA-12.

Examples of suitable polyesters are polyethylene terephtalate (PET), polybutylene terephtalate (PBT), polypropylene terephtalate (PPT), polyethylene naphtanoate (PEN), polybutylene naphtanoate (PBN).

A polyetherester respectively a polyetheramide block copolymer is understood to be a copolymer containing soft blocks of a polyether and hard polyester respectively polyamide blocks.

The polyether blocks are preferably those derived from base or acid-catalyzed ring-opening polymerization of cyclic ethers such as epoxides, oxetanes, oxolanes, and the like. The polyethers have repeat units of oxyalkylene groups (-O-A-) in which A preferably has from 2 to 10 carbon atoms, more preferably 2 to 4 carbon atoms. The polyethers can have different end groups, depending upon how the polyethers are made or modified. For example, the polyether can have hydroxyl, ester, ether acid, olefinic, or amino end groups, or the like, or combinations of these. Mixtures of different types of polyethers can be used. Preferred polyethers are polyether polyols. Examples of polyether polyols include, but are not limited to, polyoxypropylene polyols, polyoxyethylene polyols, ethylene oxide-propylene oxide copolymers, polytetramethylene ether glycols, oxetane polyols, and copolymers of tetrahydrofuran and epoxides. Typically, these polyols with have average hydroxyl functionalities from about 2 to about 8. Preferred aliphatic polyether are a poly(alkylene oxide) derived from an alkylene oxide of 2-6 C-atoms, preferably 2-4 C-atoms, or combinations thereof. Examples include poly (ethylene oxide), poly(tetramethylene oxide), poly(propylene oxide) and ethylene oxide-terminated poly(propylene oxide).

Suitable polyester respectively polyamide blocks in the polyetherester respectively polyetheramide block copolymers are those defined above for the polyester respectively the polyamide. The hard polyester block is preferably built up from ethylene terephthalate or propylene terephthalate repeating units, and in particular from butylene terephthalate units. Preferred polyester blocks are PBT blocks. Preferred polyamide blocks are aliphatic polyamide blocks, preferably PA6, PA66 or PA12.

Examples and preparation of block copolyesters are for example described in Handbook of Thermoplastics, ed. O. Olabishi, Chapter 17, Marcel Dekker Inc., New York 1997, ISBN 0-8247-9797-3, in Thermoplastic Elastomers, 2nd Ed, Chapter 8, Carl Hanser Verlag (1996), ISBN 1-56990-205-4, in Encyclopedia of Polymer Science and Engineering, Vol. 12, Wiley & Sons, New York (1988), ISBN 0-471-80944, p. 75-117, and the references cited therein.

The polyetherester and the polyetheramide preferably has a polyether content of at least 30 wt. %. The amount of polyetherester and/or polyetheramide in the thermoplastic film is preferably such that the ether content is at least 1 wt. %, more preferably at least 2 wt. % and even more preferably at least 4 wt. % (relative to the total amount of thermoplastic polymers in the thermoplastic film). The amount of polyetherester and/or polyetheramide in the thermoplastic film is preferably such that the ether content is at most 70 wt. % (relative to the total amount of thermoplastic polymers in the thermoplastic film). Even more preferably, the thermoplastic polymers used in the thermoplastic film consist essentially of polyamide and polyetheramide and/or polyetherester. It has surprisingly been found that a packaging comprising such a thermoplastic film can advantageously be applied for foil-ripening of cheese as such packaging allows to increase the ripening, but not at the expense of the flavor development, the consistency and the mould and/or yeast growth. More preferably, the thermoplastic polymers used in the thermoplastic film consist essentially of 70 to 90 wt. % of polyamide and 10 to 30 wt. % polyetherester (relative to the total amount of thermoplastic polymers in the thermoplastic film). The polyetherester preferably has a polyether content of at least 30 wt. %.

The process further comprises closing the packaging. Preferably, the closing is effected by sealing. Preferably, at least the part of the packaging that will surround the cheese to be ripened does not contain polyolefin in substantial amounts. The amount of polyolefin (relative to the total packaging) is preferably at most 30 wt %, more preferably at most 20 wt. % and even more preferably at most 10 wt. %. Even more preferably, at least the part of the packaging that will surround the cheese to be ripened does not contain polyolefin.

One of the important properties for a film used for packing food is the seal ability of the material. The fundamental principles in heat sealing are to provide heat at the interfaces, pressure to bring them intimately in contact, and complete a weld, all within an acceptable period of time. When heat is applied, the thermoplastics melt and act like a glue in effecting a seal. Too much heat cannot usually be applied directly to unsupported films because they melt and stick to the surface of the sealing bar (bar sealing is the most widely used method for sealing). In that case the seal area is destroyed in the process and for that reason such materials better be sealed by impuls sealing. Another solution is applying a dedicated seal layer at the inside of the film, that needs less heat load to effect a seal. Examples of such dedicated layers are a polyolefin layer (being a water barrier) or a dedicated coating (being water permeable). In case a polyolefin layer is used for sealing purpose, the part of the packaging that will surround the cheese to be ripened preferably does not comprise such layer.

Preferably, the packaging is tightly covering the surface of the cheese to be ripened in order to prevent that air is present between the cheese and the packaging in order to prevent or reduce the undesirable formation of moulds. The presence of air is disadvantageous as this may result in inadequate moisture leave and hence in a ripening process that is non-homogeneous over the entire cheese. In view of this, the packaging is preferably heat shrinkable and/or the process further comprises vacuumizing prior to closing the packaging. Such vacuumizing is known in the art and are for examples described in The Wiley Encyclopedia of Packaging Technology, Aaron L. Brody, Kenneth S. marsh—$2^{nd}$ ed., ISBN 0-471-06397-5, p 949-955. Vacuumizing is performed at a pressure of 0.5-100 mbar, for hard to semi-hard cheese preferably at 5-25 mbar. Vacuumizing is advantageous as it exclude oxygen and by that reduces the conditions for mould growth. Vacuumizing is not applied when ripening soft cheeses, at least not to very low pressure levels.

In order to further prevent or reduce the undesirable formation of moulds and/or yeast, the process of the present invention preferably further comprises treating the cheese after brining with a composition comprising an antimicrobial compound such as for example natamycine and/or nisine prior to introducing the cheese into the cheese-ripening packaging. Such treating can be performed by immersing the cheese after brining in the solution and/or by spraying the solution on the surface of the cheese after brining. EP-A-867124 and EP-A-678241 for example describe said treating and examples of said composition.

In one embodiment of the invention, the cheese-aging packaging is a container, usually obtained by thermoforming, containing a covering layer. In this embodiment, the process comprises introducing cheese after brining into a container and closing the container by, preferably hermetically, sealing a layer onto the container covering the opening for receiving the cheese to be ripened.

In another and more preferred embodiment of the invention, the cheese-aging packaging is a bag. A bag is preferred above the packaging consisting of a container and a lidding film. This is because producing a bag of which the surface that will surround the cheese to be ripened possess a specific water vapor transmission rate and a specific oxygen permeability is easier than producing a container having a specific water vapor transmission rate and a specific oxygen permeability over the surface that will surround the cheese to be ripened. In this embodiment, the process comprises introducing cheese to be ripened into a bag and closing the bag by, preferably hermetically, sealing the opening for receiving the cheese to be ripened. The bag may be produced from flat film and contain at least one seal or alternatively, the bag may be produced from a tubular film resulting in a seamless tubular casing.

Preferably, the process further comprises storing the foil packaged cheese to be ripened such that moisture can leave the foil packaged cheese. This can for example be obtained by leaving enough room between the stored foil packaged cheeses and/or by regulating the relative humidity of the environment such that the environment has a lower relative humidity than the relative humidity of the environment.

The ripening process is preferably effected at decreased temperature such as for example a temperature between 4 and 14° C., preferably between 10 and 14° C. and more preferably between 12 and 14° C. and at a relative humidity of 75-85%.

It has surprisingly been found that even at ripening conditions (i.e. increased temperature) that are typical for a natural ripening process with the process of the invention there is less or even no off flavor development, and in particular at increased ripening, compared with ripening in a multilayer foil as for example described in DE10062417. In general, the ripening lasts at least for 4 weeks (young cheese) and can last for example to obtain a matured cheese for 12 to 16 weeks and for obtaining an old cheese for al least 10 months.

Preferably, the cheese to be ripened is a Gouda, Emmental or Edam type, in particular the Gouda type or Edam type, and more in particular a Gouda cheese.

The present invention further relates to a cheese-aging packaging containing an opening for receiving cheese to be ripened, wherein the cheese-aging packaging comprises a thermoplastic, monolithic film and the closed cheese-aging packaging has a water vapor transmission rate of at least 10 $g/m^2/24$ hours measured according to ASTM E96B cup test at 10° C. and 85% relative humidity and an oxygen permeability of at most 100 $cm^3/m^2/24$ hours/atm (measured according to ASTM standard D3985 at 10° C. and 85% relative humidity on a film using Mocon equipment) nd the closed cheese-aging packaging having dimensions corresponding to the dimensions of the ripened cheese block.

The present invention further relates to a cheese package comprising cheese and a cheese aging packaging as described above and wrapped around the cheese and closed by sealing.

The present invention further relates to the cheese obtainable using the process according to the invention. Such cheese is characterized in that it does not contain a plastic coating on the surface of the ripened cheese and in that the difference in L value at the surface of the cheese and at the center of the cheese block is higher than 0.5, preferably higher than 1 and even more preferably higher than 2. In particular, it has been found that after ripening a cheese block sized 35×30×11 cm for 16 weeks, the difference in L value at 2 mm below the center of the upper side surface ($L_1$) and at the center of the cross section obtained by cutting the cheese in half (such that a block of 35×15×11 cm is obtained) ($L_2$) is higher than 0.5 and lower than 11. As used herein, the L value of a color is a measure for the lightness of a color according to the Commission Internationale de l'Eclairage L*a*b* color space (CIE 1976; hereinafter "CIELab"). The L*a*b* colorimetric system was standardized in 1976 by Commission Internationale de l'Eclairage (CIE). The CIELab L value, utilized herein to define the darkness/lightness of the polymer composition according to the present invention, is a unit of color measurement in the afore-mentioned CIELab system. A color may be matched according to the Commission Internationale de l'Eclairage L*a*b* color space (hereinafter "CIELab"). CIELab is a mathematical tristimulus color scale based on the CIE 1976 standard. In the L*a*b* colorimetric system, L refers to lightness expressed by a numerical value of from 0 to 100, in which L=0 means that the color is complete black, and L=100 means that the color is complete white. The contrast between the center ($L_2$) and the surface ($L_1$) of a ripened cheese block sized 35×15×11 cm can be expressed as ΔL, ΔL is the difference in L values between the two colors and is calculated by: $\Delta L=L_2-L_1$.

It should be noted that the packaging as described above can also be advantageously used for curing of sausages.

The invention is now being demonstrated by means of a series of examples, but is not restricted in any way to the embodiments shown in the examples.

EXAMPLES AND COMPARATIVE EXPERIMENTS

Cheese

For the experiments, freshly brined untreated Gouda 48+ cheeses have been bought from Veerman, a Dutch cheese trader in Bodegraven. The cheeses are of the so called block shape and measure roughly 35×35×11 cm and weigh ca. 12.5 kg each. The cheeses are produced in the June and taken from one batch with successive cheese quality marks. One day after delivery of the cheeses, the cheeses have been treated (optional) and packed at the DSM Foodlab in Delft. The packaging films (see Table 1) used for the experiment were designed for cheeses of a width of 30 cm. For obtaining a block shaped cheese measuring ca 35×30×11 cm, a slice of 5 cm was cut of the cheeses prior to treatment (optional) and packaging.

Treatment (Optional)

To differentiate on surface treatment of the cheeses, the half of the cheeses to be packed in the different films are, prior to introducing the cheeses into the packaging, immersed in Delvocoat® of DSM (cheese coating for the surface treatment of hard and semi-hard cheese) with the production code 04110. The cheeses have been immersed for 5 seconds and right after 5 seconds draining, the so treated cheeses have been packed in the respective films. The non treated cheeses have been packed directly (without immersion) into the respective films.

As a reference, some cheeses have been coated with Plasticoat® AGD 625 from DSM and can be referred to as natural (traditionally) ripened. The cheeses coated with Plasticoat® have been coated 3 times: At day 0, 5 and 9 one side of the cheese was coated while the other was coated on day 2, 7 and 12.

Packaging Material

The aim of the experiment was to differentiate in drying and taste development of the cheeses, by packing and treating the cheeses differently while having the same ripening conditions.

Six untreated cheeses and six treated cheeses were packed in packaging consisting of material 1-5 (as indicated in table 1 below) respectively, resulting in 60 cheeses to be ripened. Next to these cheeses, also 6 untreated cheeses were coated with Plasticoat® AGD 625 containing 0.05% natamycine. This resulted in 11 different cheese samples at the start of the ripening process: treated/untreated cheeses packed in packaging 1-5 (10 different samples) and one sample being untreated cheese coated with Plasticoat® AGD 625.

TABLE 1

| PACKAGING | MATERIAL | | OXYGEN TRANSMISSION RATE OTR (ASTM D3985 AT 10° C. AND 85% RH) IN CC/M2 · DAY · ATM | WATER VAPOR TRANSMISSION RATE WVTR (ASTM E96B CUP TEST AT 10° C. AND 85% RH) IN G/M2 · DAY |
|---|---|---|---|---|
| 1 | Reference vacuum bag, Polyamide/ Polyethylene (20µ/80µ) (Comparative Experiments) | 100 µm | 25 | <1 |
| 2 | Akulon ® (Example according to the invention) | 50 µm | 9 | 20 |
| 3 | Akulon ®/Arnitel ® (Example according to the invention) | 50 µm | 20 | 30 |
| 4 | Akulon ®/Arnitel ® (Example according to the invention) | 30 µm | 30 | 39 |
| 5 | Arnitel ® (Comparative Experiments) | 30 µm | >1000 | 65 |
| 6 | Plasticoat ® AGD 625, 0.05% natamycine | 3 times in 12 days | >1000 | n.a. |

The reference vacuum bag (packaging 1 in Table 1) is bought from Paardekoper, a trader in packaging material in Oud-Beijerland (The Netherlands) (article number 157406). The Akulon® (polyamide-6), the Akulon®/Arnitel® and the Arnitel® (polyetherester) films have been produced with by the industry known conditions at a Kuhne blown film line. For the Akulon® film the F-136-E2 grade was used and for the Arnitel® film the VT3108 grade was used. The Akulon®/ Arnitel® blend consist of 85 wt. % Akulon® F-136-E2 and 15 wt. % Arnitel® VT3108.

Packaging Equipment

For vacumizing the packaging consisting of material 1-5 (see table 1) and sealing the film, a Möllervac 500 chamber vacuum machine was used. Vacuum conditions were set at 30 mbar. Induction sealing for the reference vacuum bag, the Akulon® and Akulon®/Arnitel® film was set at 2.2-2.5 sec. For the Arnitel® film the sealing time was set at 1.5-1.7 sec.

Ripening

After packaging, vacumizing and closing the packaging by sealing, the ripening of the cheeses was realized in a ripening cell with wooden shelves and an air treatment system for each individual cheese. Behind every cheese a piping system delivers airflow to control the environmental conditions near the cheese. The conditions in the cell were set at 13° C. and 85% RV. Cheeses have been ripened to maximum 16 weeks and are being turned every week. After week 4, the ripening of the cheese packed in the Arnitel® 30μ packaging (packaging 5 in table 1) was stopped due to unacceptable mold growth. As a result of this, 9 different cheese samples are further evaluated after week 4.

Measurement

During the ripening of the cheeses, the following measurements have been done:

Weight measurement: the weight of the different cheese samples is measured. This non destructive measurement is done at week 0 (after packaging), 1, 2, 3, 4, 6, 8, 10, 12, 14 and 16. The reduction of the weight of the cheeses in the course of the ripening represents the moisture loss of the cheeses in the course of the ripening.

Taste: The 9 different cheese samples have been tasted by an experienced internal taste panel at week 6, 12 and 16. For this tasting, the packaging is first removed and thus destructed. This means thus that after each taste session (i.e. after week 6 and 12), the ripening is continued with 9 cheeses less.

Yeast count and lactobacilli count: While the packaging is destructed at the tasting, these cheeses are also used for analyses at the COKZ (controlling authority of the Netherlands for milk and milk products). These yeast count and lactobacilli count analyses have been carried out at week 0 (prior to packaging), 1, 6 and 12.

The results of these measurements are given below.

Weight

The weight of the cheeses was (none destructively) measured right after packaging (week 0) and at week 1, 2, 4, 6, 8, 10, 12, 14 and 16.

The measurement of the weight of the different treated cheese samples during ripening resulted in the graph as given in FIG. 1. This figure shows the relative weight loss during ripening of treated cheeses packed in material 1-5 and the cheese treated with material 6.

The results on weight loss of the non treated cheeses are comparable with the weight loss results of the treated cheeses. After week 4, the Arnitel® 30 experiment was abandoned due to unacceptable mold growth.

As can be derived from the figure, different materials for film contribute to differences in permeability for moisture. E.g. the reference film with polyolefin inside shows no weight loss, while 100% Arnitel® film losses even more moisture than Plasticoat® coated cheeses. Other materials and combinations fit within this spectrum.

Mixtures of different base materials show different permeability for moisture as well as barrier to oxygen. E.g. 100% Akulon® shows a high barrier to oxygen and a medium permeability to moisture, while Akulon®/Arnitel® shows a good barrier to oxygen and a high moisture permeability.

Differences in thickness result in differences in moisture permeability as shown by the thickness variances of Akulon®/Arnitel®.

It has been found that the cheeses ripened in packaging 4 (Akulon/Arnitel 30) has a consistency that resembles most the consistency of the ripened cheese coated with material 6 while the consistency of the cheeses ripened in packaging 1 has a consistency that resembles least the consistency of the ripened cheese coated with material 6.

Taste

At week 6, 12 and 16 of the ripening, the cheeses have been tasted by a panel. Tasting resulted in the following conclusions per tasting session:

At week 6, the cheeses ripened in packaging 1 are too sticky and lacks enough firmness and are slightly bitter. With the packaging 2, the firmness and the flavor development increases and the stickiness decreases. The firmness and the flavor development further increases and the stickiness further decreases with the packaging 3 and even evaluates with the packaging 4 towards the firmness, flavor development and stickiness of the cheese coated with material 6. Furthermore, it has been observed that the surface of the cheeses packed in packaging 2-4 evolves to a dry-rind.

At week 12, the cheeses ripened in packaging 1 are pale, too sticky, too soft, and have an off flavor (bitter). The firmness and the flavor development increases and the stickiness and bitterness decreases with the packaging 2. The firmness and the flavor development further increases and the stickiness and bitterness further decreases with the packaging 3 and with the packaging 4 even evaluates towards the firmness, flavor development and stickiness of the cheese coated with material 6. In addition, the paleness decreases and a color deviation arise between the center and the surface of the cheese when using the packaging 3 and even more when using the packaging 4. Furthermore, it has been observed that the dry-rind of the cheeses packed in packaging 2-4 becomes darker and thicker.

At week 16, the same was observed as at week 12. In addition, the color deviation between the center and the surface of the cheese when using the packaging 3 increases even more and even more when using the packaging 4. Moreover, by taste evaluation at week 16, the flavor development and/or consistency of the cheese ripened in packaging 1 diverges from the flavor development and/or consistency as obtained with cheeses packed in packaging 2, 3 and 4. Furthermore, it has been observed that the dry-rind of the cheeses packed in packaging 2-4 becomes even darker and also even thicker.

Color (Measured at Week 16)

Figure 2:
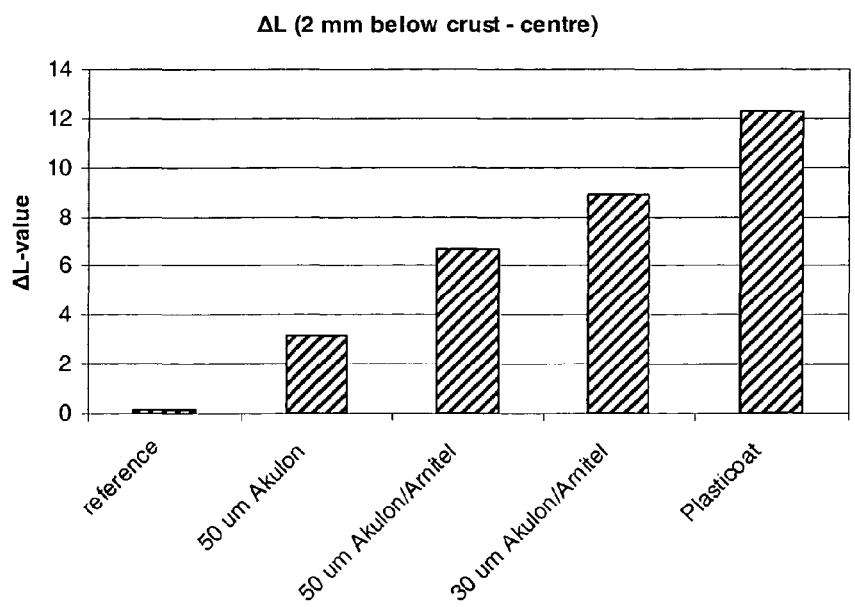
FIG. 2 shows the color of cheeses in a cross section as measured by a standard Lab test.

The color of cheeses in a cross section is measured by the standard Lab test as described above. For this measurement the cheeses were cut in half, so one obtains two half blocks sized 35×15×11 cm. Per packaging sample, from one of these blocks, L values have been measured at 2 mm below the center of the upper side surface ($L_1$) and at the center of the cross section obtained by cutting the cheese in half ($L_2$). The results are presented in FIG. 2.

In addition, it has been observed that at decreasing water content of the cheese, the color becomes darker (lower L-value).

The color under the surface does not substantially differ from the color in the centre of the cheese for the cheese in packaging, because there is no water loss. The difference in lightness under the surface and the centre of the cheese increases with increasing water vapor permeability for cheese in packaging material 2-4. Of the cheese packed in packaging 1-4, the cheese packed in material 4 has the darkest dry-rind that corresponds most to the drying rind of the cheese coated with material 6. Also cheese in material 2 and 3 develop a visible darker dry-rind (compared to cheese packed in material 1), which is desired to give the cheese a natural appearance.

Yeast Count and Lactobacilli Count (Measurements at Weeks 0, 1, 6, 12)

The yeast count and the lactobacilli count of the treated cheeses was compared with the yeast count and the lactobacilli count of the untreated cheeses. The yeast count resp the lactobacilli count of the treated cheeses was at least a factor of 100-1000 less than the yeast count resp the lactobacilli count of the untreated cheeses.

As demonstrated above, with the packaging 2-4, the less labor intensive foil-ripening process can be combined with obtaining a cheese that corresponds more to a cheese having undergone a natural ripening, i.e. increased firmness, less stickiness, more flavor development and the formation of a dry-rind. Also demonstrated is that even after 12 weeks and more even after 16 weeks, it is possible to obtain a foil-ripened cheese with reduced off flavor. This can even be achieved without the addition of adjunct starters and at an increased temperature that is typical for a natural ripening process. Thus, by varying the packaging in the foil-ripening process, the off flavor development, in particular at increased ripening, can be decreased, while with packaging 1, adjunct starters need to be added to reduce the off flavor development.

In addition, as shown above, the cheese obtained by ripening in packaging 4 has ripening characteristics corresponding most to the ripening characteristics of a natural ripened cheese. Further increasing the relative humidity of the warehouse and/or further decreasing the initial moisture content of the cheese to be ripened, however, results in that cheeses obtained by ripening in packaging 2 and 3 have ripening characteristics corresponding more to the ripening characteristics of a natural ripened cheese.

Thus, the use of water vapor permeable film with different composition and/or thickness makes it possible to control the ripening of the cheese. This allows for further variation and optimization in parameters like: moisture conditions of the warehouse, initial moisture content of the cheese and use of (additional) starter cultures, etc. All above parameters, material related as well as recipe and process related, are of influence on the final cheese taste, texture and color.

The invention claimed is:

1. A process for preparing foil-ripened cheese comprising (i) introducing cheese after brining into a cheese-aging packaging containing an opening for receiving cheese, (ii) closing the packaging, and (iii) ripening the cheese, characterized in that the cheese-aging packaging comprises a thermoplastic, monolithic film and the closed cheese-aging packaging has a water vapor transmission rate of at least 10 g/m$^2$/24 hours at 10° C. and 85% relative humidity and an oxygen permeability of at most 100 cm$^3$/m$^2$/24 hours/atm at 10° C. and 85% relative humidity.

2. The process according to claim 1, characterized in that the closed cheese-aging packaging has a water vapor transmission rate of at most 60 g/m$^2$/24 hours.

3. The process according to claim 1, characterized in that the thermoplastic polymers used for the thermoplastic film is a polyamide, polyester, polyether, the copolymers thereof or a mixture of at least two of these polymers.

4. The process according to claim 1, characterized in that the thermoplastic polymers in the thermoplastic film consist essentially of polyamide and polyetherester and/or polyetheramide.

5. The process according to claim 3 characterized in that the ether content in the thermoplastic film is at least 1 wt. % relative to the total amount of thermoplastic polymers in the thermoplastic film.

6. The process according to claim 1, characterized in that the process further comprises treating the cheese after brining with a composition comprising natamycine and/or nisine prior to introducing the cheese into the cheese-ripening packaging.

7. The process according to claim 1, characterized in that the packaging is tightly covering the surface of the cheese to be ripened.

8. The process according to claim 1, characterized in that the process further comprises vacuumizing prior to closing the packaging.

9. The process according to claim 1, the closing of the packaging is effected by sealing.

10. The process according to claim 1, characterized in that the cheese-aging packaging is a bag.

11. The process according to claim 10, characterized in that the process comprises introducing cheese after brining into a bag containing at least one seal and closing the bag by sealing the opening for receiving the cheese.

12. The process according to claim 1, characterized in that the cheese to be ripened is of the Gouda, Emmental or Edam type.

13. The process according to claim 1, characterized in that the cheese to be ripened is the Gouda type.

14. The process according to claim 1, wherein the thermoplastic polymers in the thermoplastic film consist essentially of 70 to 90 wt. % of polyamide and 10 to 30 wt. % polyetherester, relative to the total amount of thermoplastic polymers in the thermoplastic film.

* * * * *